United States Patent
Levitan et al.

(10) Patent No.: US 8,290,818 B1
(45) Date of Patent: Oct. 16, 2012

(54) SYSTEM FOR RECOMMENDING ITEM BUNDLES

(75) Inventors: Avi A. Levitan, Seattle, WA (US); Jin Yi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 260 days.

(21) Appl. No.: 12/622,242

(22) Filed: Nov. 19, 2009

(51) Int. Cl.
G06Q 30/00 (2012.01)
(52) U.S. Cl. .......................... 705/26; 705/27
(58) Field of Classification Search .............. 705/26, 705/27
See application file for complete search history.

(56) References Cited

U.S. PATENT DOCUMENTS

| | | |
|---|---|---|
| 5,909,023 A | 6/1999 | Ono et al. |
| 6,266,649 B1 | 7/2001 | Linden et al. |
| 6,356,879 B2 | 3/2002 | Aggarwal et al. |
| 6,438,579 B1 | 8/2002 | Hosken |
| 6,460,036 B1 | 10/2002 | Herz |
| 6,691,163 B1 | 2/2004 | Tufts |
| 6,782,370 B1 | 8/2004 | Stack |
| 6,912,505 B2 | 6/2005 | Linden et al. |
| 7,092,936 B1 | 8/2006 | Alonso et al. |
| 7,680,703 B1 | 3/2010 | Smith |
| 7,835,951 B1 * | 11/2010 | Burger et al. ............ 705/28 |
| 7,974,888 B2 | 7/2011 | Kane et al. |
| 7,979,315 B2 * | 7/2011 | Boler et al. ............ 705/26.1 |
| 8,117,085 B1 | 2/2012 | Smith |
| 2002/0019763 A1 | 2/2002 | Linden et al. |
| 2002/0045959 A1 | 4/2002 | Van Overveld et al. |
| 2002/0065721 A1 | 5/2002 | Lema et al. |
| 2002/0198882 A1 | 12/2002 | Linden et al. |
| 2003/0105682 A1 | 6/2003 | Dicker et al. |
| 2003/0208402 A1 | 11/2003 | Bibelnieks et al. |
| 2007/0192317 A1 | 8/2007 | Finley et al. |
| 2008/0004989 A1 | 1/2008 | Yi |
| 2009/0043665 A1 | 2/2009 | Tirumalareddy et al. |

OTHER PUBLICATIONS

Microsoft Blog: Microsoft Surface finds home in ATT stores, published Apr. 1, 2008, downloaded from Google on the Internet on Sep. 26, 2010, 2 pages.*
Spenke et al., Focus: The Interactive Table for Product Comparison and Selection, presented Nov. 6-8, 1996 at the ACM Symposium on Usr Interface Software and Technology, Seattle, copyright ACM, 1996, 10 pages.*
U.S. Appl. No. 12/343,360, filed Dec. 23, 2008, Application and Filing Receipt.
U.S. Appl. No. 12/426,441, filed Mar. 20, 2009, Application and Filing Receipt.
Agrawal et al., "Mining Association Rules between Sets of Items in Large Databases," Proceedings of the 1993 ACM SIGMOD International Conference on Management Data, pp. 207-216. (1993).
Agrawal et al. "Quest a project on database mining," Proceedings of the 1994 ACM SIGMOD International Conference on Management of Data, 1994, p. 514 (ISSN: 0163-5808).
Gery et al., "Evaluation of web usage mining approaches for user's next request prediction," Proceedings of the 5th International Conference on Extending Database Technology, pp. 3-17, 1996 (ISBN: 3-540-61057-X).
Zaiane et al., "Discovery Web Access Patterns and Trends by Applying OLAP and Data Mining Technology on Web logs," Proceedings of IEEE International Forum on Research and Technology Advances in Digital Libraries, pp. 19-29, Apr. 22-24, 1998.
Co-owned, co-pending U.S. Appl. No. 10/864,288, filed Jun. 9, 2004.

* cited by examiner

*Primary Examiner* — James Zurita
(74) *Attorney, Agent, or Firm* — Knobbe Martens Olson & Bear LLP

(57) ABSTRACT

This disclosure describes systems and methods for recommending bundles of items to users. A bundle can include an item that is substitutable for an item selected by a user and one or more related items that complement the substitutable item. For example, if a user has selected a wireless device on a page of a network application, a bundle recommendation can be provided that includes a similar wireless device and related accessories, a compatible service plan, and the like. Recommending bundles of items can be beneficial for providing users with access to items that they might like to purchase together, without requiring users to separately find each item.

10 Claims, 11 Drawing Sheets

SYSTEM FOR RECOMMENDING ITEM BUNDLES

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

BRIEF DESCRIPTION OF THE DRAWINGS

Specific embodiments will now be described with reference to the drawings, which are intended to illustrate and not limit the various features of the inventions disclosed herein. In the drawings, similar elements have similar reference numerals.

DETAILED DESCRIPTION

Purchasers of wireless handheld devices, such as mobile phones, smart phones, media players, personal digital assistants (PDAs), netbooks, and the like are often presented with a myriad of choices for wireless service plans, service plan options, wireless carriers, and device accessories. Because many service and accessory options for a given device can exist, purchasing a wireless handheld device can be a cumbersome process.

This disclosure describes systems and methods for recommending bundles of items to users. A bundle can include an item that is substitutable for an item selected by a user and one or more related items that complement the substitutable item. For example, if a user has selected a wireless handheld device on a page of a network application, a bundle recommendation can be provided that includes a similar wireless handheld device and related accessories, a compatible service plan, and the like. Recommending bundles of items can be beneficial for providing users with access to items that they might like to purchase together, without requiring users to separately find each item.

For purposes of illustration, the systems and methods are described primarily in the context of a system that detects associations among catalog items (e.g., products) for the purpose of recommending such items to users of an e-commerce network site (e.g., a web site). In particular, the systems and methods are described primarily in the context of wireless handheld devices. However, the disclosed systems and methods can also be used with other types of systems, and can be used to recommend other types of items, such as but not limited to web sites, web services, specific pages within websites, news articles, blogs, podcasts, travel destinations, service providers, other users, events, discussion boards, photos and other images, software, online videos, home theater system components and/or services, clothing, food, recipes, tagged items, and user-generated lists of items. In addition, the disclosed processes need not be implemented as part of, or in conjunction with, a web site.

As used herein, the term "item" is used interchangeably to refer to an item itself (e.g., a particular product) and to its description or data representation in a computer system. As will be apparent from the context in which it is used, the term is also sometimes used herein to refer only to the item itself or only to its data representation in the computer system.

Figure 1:
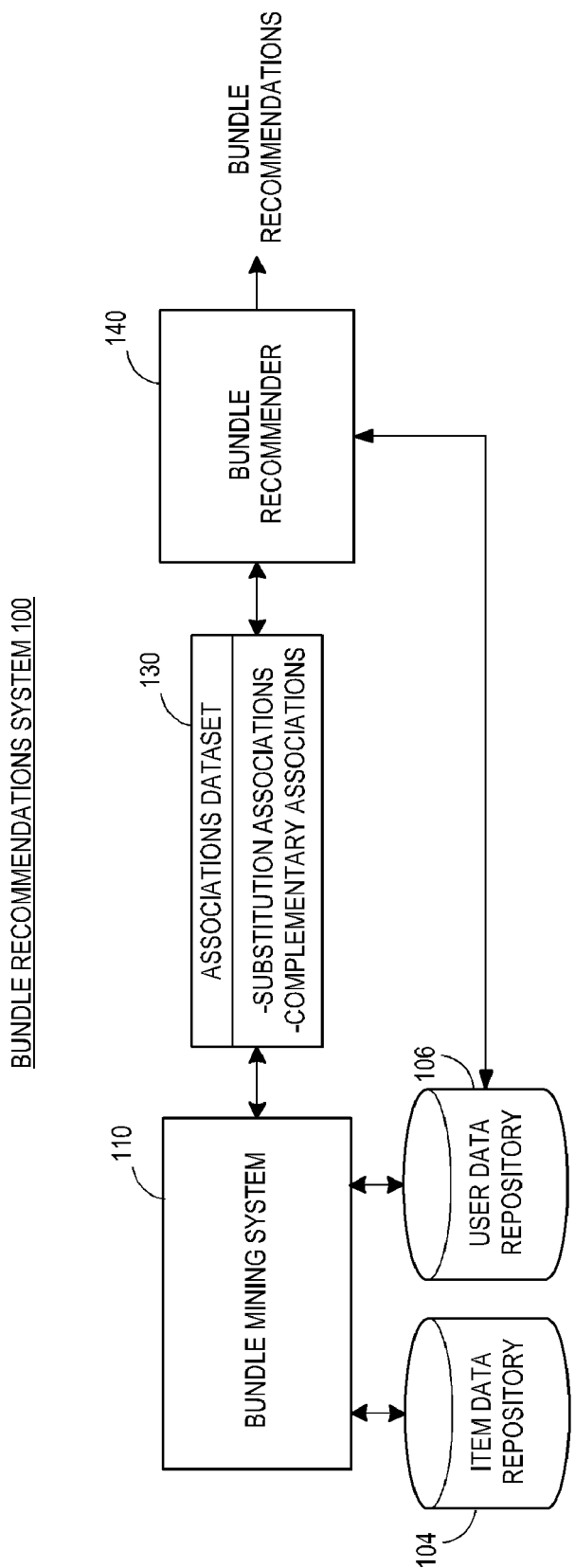
FIG. 1 illustrates an embodiment of a bundle recommendations system.

FIG. 1 illustrates an embodiment of a recommendations system 100 for recommending bundles of items to users. The recommendations system 100 includes components or subsystems for generating associations among items and for using these associations to recommend bundles of related items to users. For example, the recommendation system 100 can recommend wireless handheld device bundles, which each can include a handheld device and one or more product and service accessories.

By way of overview, the recommendations system 100 in the depicted embodiment includes a bundle mining system 110 that may include hardware and/or software for detecting associations or relationships between items. These associations can facilitate creating bundles of items. The bundle mining system 110 can store the item associations in an associations dataset 130. The recommendations system 100 also includes a bundle recommender 140 that may include hardware and/or software for accessing the associations dataset 130 as well as user data to generate personalized, bundle recommendations. The bundle recommender 140 can output these recommendations to a user directly or to another computer system, for example, via calls to a web service (not shown).

The bundle mining system 110 can detect associations or relationships between items represented in an item data repository 104. The item data repository 104 may include physical computer storage that stores item data representations of real items. The items represented by the item data may include any of the items described above, including products and services. In one embodiment, the item data repository 104 includes an electronic catalog that arranges the items hierarchically by categories, according to subject matter.

The bundle mining system 110 can also analyze user data stored in a user data repository 106 to detect associations. The user data repository 106 may include physical computer storage that stores behavioral data about users. This behavioral data can include information about items users have selected for viewing and/or purchasing, among other things.

Advantageously, in certain embodiments, the bundle mining system 110 detects associations or relationships between primary or base items. The primary items may be items that can be the focus of item selection activity, such as item purchase activity. Because many users tend to buy other items based on the type of primary item they purchase, primary items can be useful items to build bundles around.

One example of a primary item could be a wireless handheld device. Wireless handheld devices can be primary items because many users select many related products and/or services based on the particular types of wireless devices selected by the users. Users tend to select wireless service plans, carriers, and wireless accessories, for instance, which are compatible with a particular brand or type of wireless handheld device. Of course, bundles of items may be constructed using any items, and not just primary items, as will be described in further detail below.

Other examples of primary items include computers, cameras, and clothing items. With computers, users may purchase related software, peripherals, and the like. Similarly, purchasers of cameras may also purchase related cases, memory devices, and other accessories. Particular clothing items may lend themselves to being related to other items, such as dresses, which users may select together with matching handbags, shoes, and jewelry. Thus, bundles may be constructed using any of these types of items, as well as others. However, many other items not specifically described herein may also be used to generate item bundles, including, for example, other electronic devices, software, exercise equipment, toys, tools, and so on.

Advantageously, in certain embodiments, the bundle mining system 110 identifies primary items from the item data repository 104 and detects substitution associations among those items. The substitution associations can reflect a degree to which the primary items are similar to or substitutable for each other. An example of substitutable items could be two different wireless handheld devices that have similar features but are offered by different carriers. In some embodiments, items with more similar features in common might be assigned a higher degree of substitutability than items that have fewer features in common.

In certain embodiments, the bundle mining system 110 can detect the substitution associations by analyzing information contained in the item and/or user data repositories 104, 106. For example, the bundle mining system 110 can compare features or attributes of items. The bundle mining system 110 can also analyze behavioral data of users regarding which items users selected together. More details regarding these techniques are described detail below with respect to FIG. 2.

The bundle mining system 110 can identify items in the item data repository 104 that are complementary with some or all of the items in the substitution associations. The bundle mining system 110 can create complementary associations between the complementary items and the primary items. In addition, the bundle mining system 110 can create complementary associations between the complementary items.

Complementary items for a wireless handheld device might include, for example, a wireless plan (e.g., a number of minutes per month), a carrier (e.g., AT&T, VERIZON, or the like), service options (e.g., a data plan or text messaging plan), product accessories (e.g., a case), and the like. In other embodiments, a carrier may not be considered a complementary item but instead may be considered an attribute of a wireless device.

In certain embodiments, the bundle mining system 110 can detect the complementary associations by analyzing information contained in the item and/or user data repositories 104, 106, as is described in more detail below with respect to FIG. 2. For example, the bundle mining system 110 can detect the complementary associations based on user behavioral data stored in the user data repository 106. Complementary association mining based on behavioral data for wireless handheld devices can be based on the principle that for any given phone there may be a plan, a carrier, service options, product accessories, or the like that users typically select (e.g., purchase) together at a higher incidence of co-occurrence than random chance. To illustrate, many people who purchase certain wireless handheld devices purchase an unlimited data plan. Based on this behavioral information, the bundle mining system 110 can create a complementary association between certain wireless handheld devices and unlimited data plans.

The bundle mining system 110 can store the substitution and complementary associations as item-to-item mappings, optionally together with scores reflecting the strength of the mappings, in the associations dataset 130. In certain embodiments, the item-to-item mappings may be represented in tables or other data structures of the associations dataset 130.

In certain embodiments, the bundle recommender 140 can include hardware and/or software for analyzing the associations dataset 130 and user activity data to generate bundle recommendations. The bundle recommender 140 may obtain user activity data of one or more target users from the user data repository 106. User activity data may include (in the example context of e-commerce) users' purchase histories, item viewing histories, item download histories, item rental histories, item ratings, and item tags, among other possible activity data.

By analyzing the user activity data, the bundle recommender 140 may determine items selected by a selected target user, e.g., for viewing, purchase, download, or the like. The bundle recommender 140 may then identify one or more bundles of items from the associations dataset 130 using one or more items selected by the target user. For example, the bundle recommender 140 can identify bundles of items based on an item most recently selected by the user, which the user may currently be viewing. The bundle recommender 140 can also identify bundles of items based on items previously selected by the user, which the user is not currently viewing.

If an item selected by the user is a primary item, the bundle recommender 140 can identify bundles by finding one or more substitutable items for the primary item in the associations dataset 130. The bundle recommender 140 can then identify items that are complementary to the one or more substitutable items. The bundle recommender 140 can group each substitutable item with a subset of its complementary items to form a bundle. The subset may include some or all of the complementary items that are complementary to the substitutable item. The bundle recommender 140 can output a subset of the bundles to the user as recommendations. The bundle recommender 140 can also store the bundles in the associations dataset 130 for recommendation to users who subsequently select the primary item.

As mentioned above, in some implementations the bundle mining system 110 can generate substitution associations between any items in the item data repository 104, and not just primary items. Likewise, the bundle mining system 110 can generate complementary associations between any items in the item data repository 104. The bundle recommender 140 can identify bundles by finding substitutable items for any items selected by a user and by finding complementary associations for those substitutable items.

In another embodiment, described in more detail below with respect to FIG. 3A, the bundle mining system 110 can use the data in the associations dataset 130 to pre-generate bundles of items. The bundle mining system 110 can store these bundles in the associations dataset 130. Then, in response to a user request for recommendations or some other user action, the bundle recommender 140 can access one or more bundles that include substitutable items for an item selected by the user. The bundle recommender 140 can provide these bundles as recommendations.

The bundle mining system 110 can mine data and identify bundles concurrently with other actions performed by users. The bundle mining system 110 can also operate to generate and store bundles when users are not online. The bundle mining system 110 can operate on a periodic or aperiodic basis during off-peak processing times. For example, the bundle mining system 110 may update the associations dataset 130 once daily but may also update more or less frequently in certain implementations. Many other variations and configurations of the bundle mining system 110 may also be implemented.

In addition, any item or set of items can be used to generate bundle recommendations. To illustrate in the wireless context, instead of using a wireless handheld device as the primary item for building a bundle, the bundle mining system 110 can generate a bundle based on a wireless plan. The bundle mining system 110 could start with a particular plan, find substitutable plans, and find complementary items for each of the substitutable plans to generate bundles. In another embodiment, the bundle mining system 110 can also generate substitution and complementary associations between sets of items (e.g., wireless devices and plans). This type of flexibility in bundle creation can allow users to select any item or set of items and request related bundle recommendations.

Although this disclosure describes the generation and recommendation of bundles primarily in the context of wireless devices, the techniques described herein are applicable to other items, including any of the items described above. For example, the bundle mining system 110 can generate bundles that included various network services (e.g., web services), such as network hosting services, storage services, other cloud computing services, and the like. The bundle recommender 120 can recommend the network service bundles to users. For example, the bundle recommender 120 could recommend a bundle having a similar level or tier of service as a bundle selected by a user.

Figure 2:
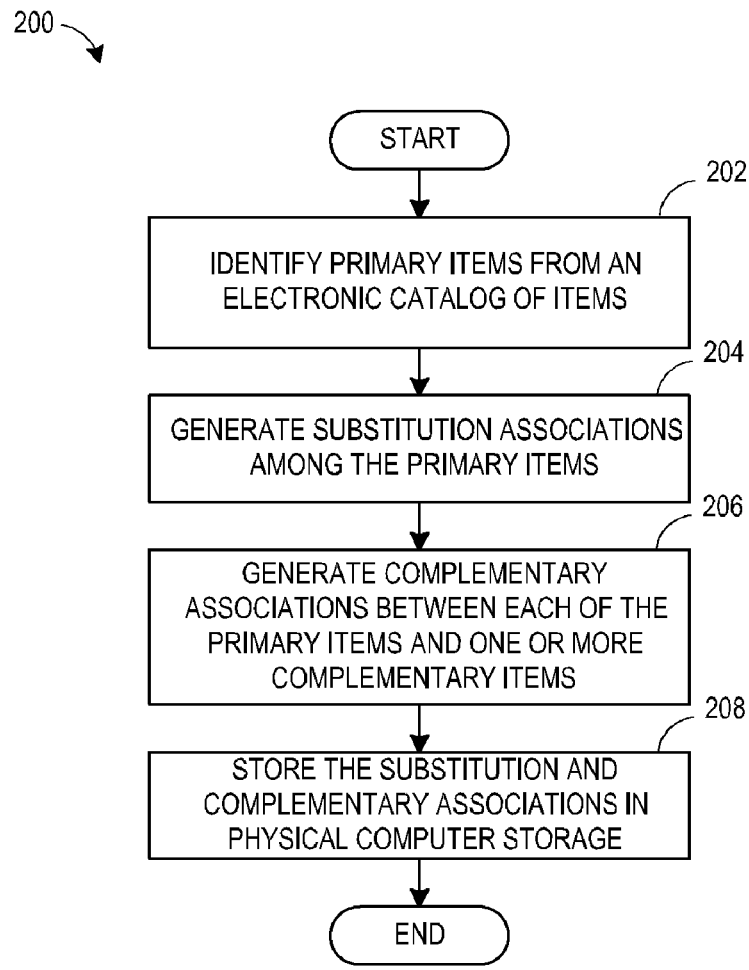
FIG. 2 illustrates an embodiment of a process for mining associations for use in recommending bundles of items.

FIG. 2 illustrates an embodiment of an associations mining process 200 for detecting substitution and complementary associations among items. The association mining process 200 can be implemented by the bundle recommendations system 100. In particular, the associations mining process 200 may be implemented by the bundle mining system 110. Advantageously, in certain embodiments the associations mining process 200 creates relationships among items that can be used to generate bundle recommendations (see FIG. 3).

In the depicted embodiment, the associations mining process 200 creates associations using primary items. As described above, primary items, such as wireless handheld devices, can be used to create bundles of items. However, in alternative embodiments, the features of the associations mining process 200 can be extended to any subset of items in an electronic catalog, including non-primary items.

With continued reference to FIG. 2, primary items are identified from an electronic catalog of items at block 202. The primary items may be identified by selecting items from a particular category in a hierarchy of the electronic catalog. For example, if wireless handheld device bundles are to be generated, the bundle mining system 110 can select items from a wireless handheld device category of the catalog. Primary items can also be identified by using one or more keywords (e.g., "wireless," "phone," or the like) in a search of the item data in the item data repository 104.

At block 204, substitution associations are generated among the primary items. Substitution associations can be generated in different ways. In one implementation, the mining system 110 can detect substitution associations between two items based on an analysis of their attributes or features. Items that have more attributes in common may be considered stronger substitution associations and may therefore be given higher association scores. Items that have fewer attributes in common may be given lower scores or an association may not be created for those items.

In certain embodiments, the attributes of an item are inherent characteristics of an item. Thus, the attributes are not item associations in certain implementations. Attributes of wireless handheld devices might include, for instance, screen size, keypad/keyboard type, screen type (e.g., touchscreen or non-touchscreen), WiFi capability (e.g., IEEE 802.11a,b,g,n etc.), GPS capability, camera configuration, and the like. Items may be considered to possess an attribute or not; or alternatively, different items may be considered to possess varying degrees of an attribute. Data that reflects one or more attributes, such as a numerical value, may be stored in association with each item in the item data repository 104. The mining system 110 can determine these attributes by accessing the numerical values, by analyzing textual descriptions or tags used to describe items, or the like.

The mining system 110 can also analyze user behavior to determine item substitutability instead of or in addition to analyzing item attributes. For example, the mining system 110 can create substitution associations between items that were selected by users in a single electronic catalog browsing session. In some implementations, user item selections indicative of substitutability can include item views, item searches, and the like. Thus, the more users that selected (e.g., viewed) two items in the same session, in one embodiment, the stronger the substitution association the mining system 110 may create for those items.

In certain implementations, the bundle mining system of a 110 may also detect substitution associations using the association mining techniques described in U.S. Publication No. 2008/0004989 filed Jun. 16, 2006, entitled "Extrapolation of Behavior-Based Associations to Behavior-Deficient Items," the disclosure of which is hereby incorporated by reference in its entirety. In addition, the bundle mining system 110 can detect behavioral associations using the association mining techniques described in U.S. Pat. No. 6,912,505 and/or U.S. Provisional Application No. 61/110,498, the disclosures of which are hereby incorporated by reference in their entirety.

With respect to block 206, complementary associations are generated between each of the substitutable items and one or more complementary items. The complementary associations may be generated by analyzing user behavior with respect to the substitutable items and other items in the item data repository 104. The behavioral techniques described above may also be applied to determine complementary associations. For example, the mining system 110 can create complementary associations between items that were selected by users in a single electronic catalog browsing session. Purchases are one example of user item selections that may be indicative of complementary relationships between items. Users who purchase a certain type of wireless handheld device, for instance, might tend to also purchase certain accessories and service options.

In some cases, the complementary items may be items which users typically purchase together with the substitutable items identified above, but which might not be good candidates for a bundle. Highly popular items, for instance, can be found to be complementary with several items that may appear unrelated. In order to provide users with bundles that appear to include appropriate items, in some cases the complementary items may be limited to items from certain categories. In the embodiment where bundles are created for wireless handheld devices, the complementary items might be limited to categories such as "headsets," "wireless plans," "car kits," and the like.

At block 208, the substitution and complementary associations are stored in physical computer storage. The associations can be stored in the associations datasets 130 described above. In some implementations, the mining system 110 can store the substitution and/or complementary associations as graph data structures. For example, the mining system 110 could store the complementary associations in a graph data structure similar to that shown in FIG. 4.

Figure 4:
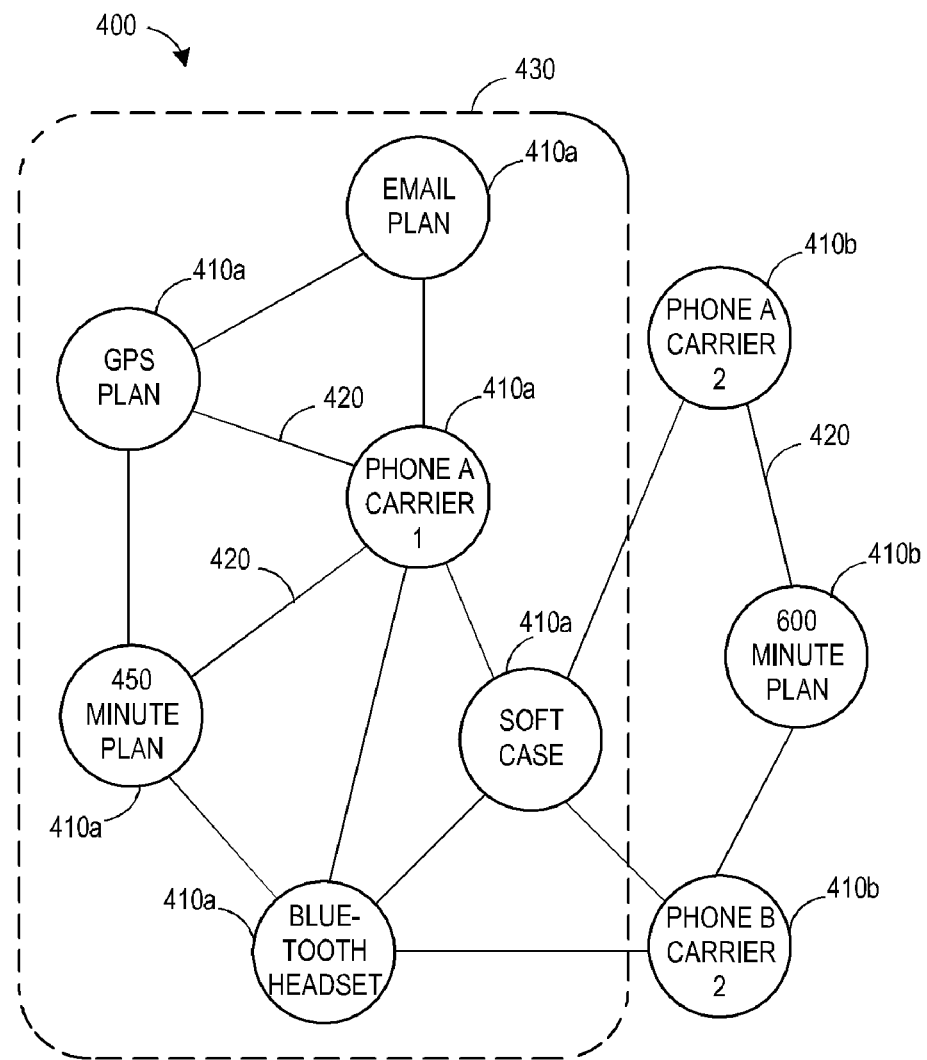
FIG. 4 illustrates an example graph data structure for generating bundles of items.

Referring to FIG. 4, an example graph 400 shown depicts relationships between complementary items. The graph 400 is a simplified graph, and many other products and services may be included in an actual graph of complementary associations. The graph 400 includes nodes 410 and edges 420. Each node 410 can represent one or more items. Each edge 420 is shown as a line joining two nodes 410, which represents a complementary association between the two nodes 410 connected by the edge 420. Although not shown, the edges may be weighted with values that represent the strength of the associations.

The graph 400 includes certain nodes 410 that represent primary items (e.g., Phone A, Carrier 1; Phone A, Carrier 2; and Phone B, Carrier 2). Some primary items, like the Phone A, have different nodes because these phones are offered by different carriers (Carriers 1 and 2). This representation of phones and carriers, however, is merely an example. In other embodiments, a particular carrier can be represented as a separate node from a phone as a complementary item with respect to the phone.

Associated with the primary items are nodes 410 representing complementary items, such as a "Bluetooth Headset" node 410 and a "450 Minute Plan" node. Certain of the complementary items are associated with each other. In addition, some of the complementary items, such as the "Soft Case," are associated with multiple primary items (e.g., with Phone A and Phone B).

For ease of illustration, directionality is not shown along the edges. However, the graph 400 could be a directed graph in other embodiments, in which case the edges could include arrows indicating the direction of the associations. For example, an arrow pointing from the "Phone A, Carrier 1" node 410a to the "GPS Plan" node 410 could indicate that Phone A is associated with the GPS plan, but not vice versa. Alternatively, the arrow connecting these two nodes could be bidirectional, indicating that the GPS plan is also associated with Phone A.

The graph 400 can be used to generate bundles of items, as will be described below with respect to FIG. 3. The graph 400 could be implemented in a variety of ways, such as with an adjacency matrix or list.

The complementary associations dataset may be improved by supplementing the dataset with additional data about user behavior, when available. In the wireless device context, information about a user's previous wireless device and plan can aid the detection of complementary associations when the user is upgrading to a different wireless device. When users upgrade wireless devices, they often purchase different phones but keep the same service plan and service options. Thus, the bundle mining system 110 can determine that the same plan and service options that complement the user's previous wireless device would also complement the device the user is upgrading to. This information can improve the quality of the complementary associations. In addition, when a user upgrades devices, an upgrade association could be made between the user's old and new devices. Information on upgrade associations can be used to recommend upgrades to other users.

Figure 3A:
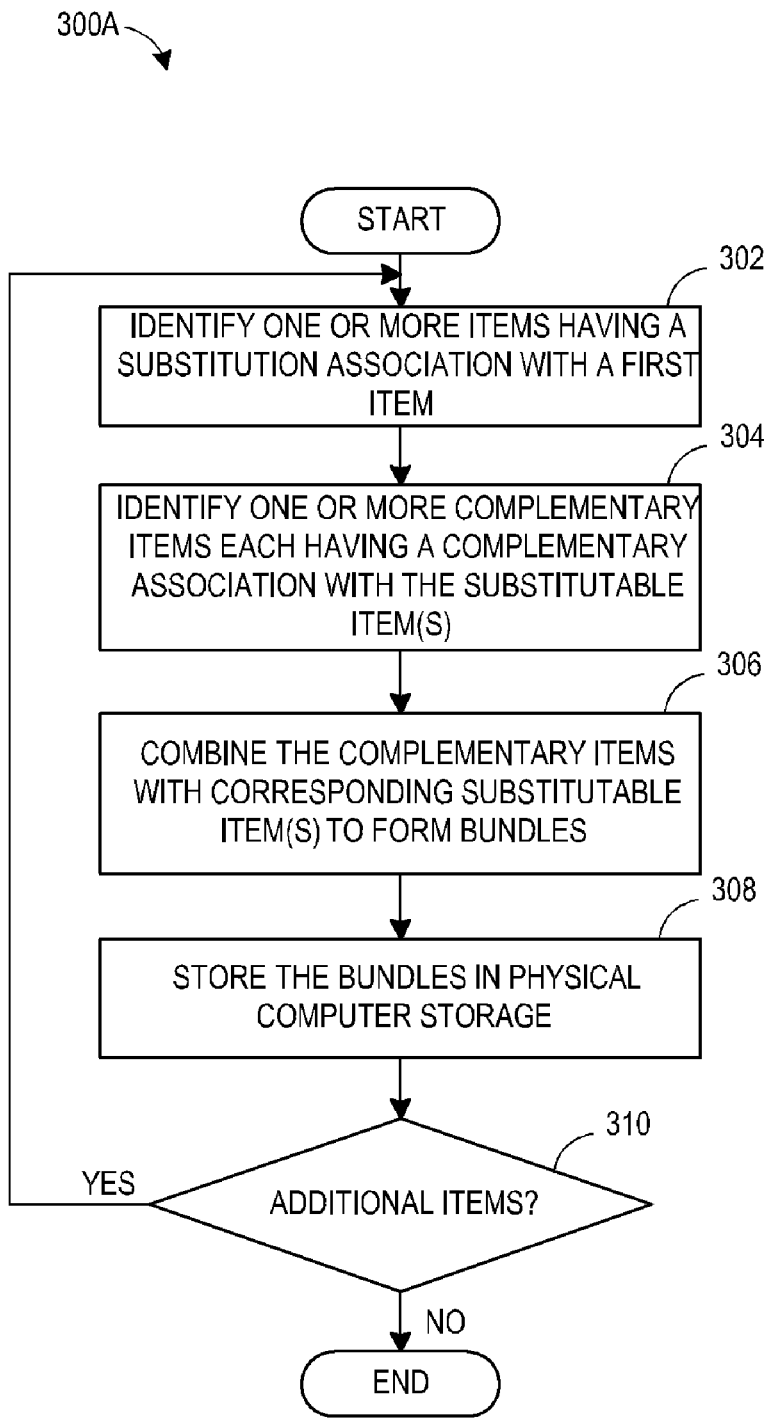
FIG. 3A illustrates an embodiment of a process for generating bundles of items.

Referring to FIG. 3A, an embodiment of a bundle generation process 300A is shown. The bundle generation process 300A can be implemented by the recommendations system 100. In particular, the bundle generation process 300A may be implemented by the bundle mining system 110.

Advantageously, in certain embodiments the bundle generation process 300A creates bundles of items from the associations created using the association mining process 200. The bundle generation process 300 can generate bundles of items offline (e.g., not in response to a request for recommendations) and store the bundles for later access. An alternative process for generating bundles dynamically in response to a request for recommendations is described below with respect to FIG. 3C.

At block 302, one of more items having a substitution association with a first item are identified. The first item could be a representation of a primary item, such as a wireless handheld device. Alternatively, the first item could be any item in the item data repository 14. Identifying one or more substitution associations with the first item can include looking up the first item in the associations dataset 130 to find related substitutable items. A subset of these substitutable items may be selected, for example, by selecting one or more of the highest scored substitution associations.

At block 304, one or more complementary items each having a complementary association with the substitutable items are identified. Identifying one or more complementary associations with the substitutable items can include looking up the substitutable items in the associations dataset 130 to find related complementary items. A subset of these complementary items may be selected, for example, by selecting one or more of the highest scored complementary associations.

In an embodiment, the complementary items are stored in a graph data structure. The complementary items may be obtained by selecting a subgraph of the graph data structure. For example, referring again to FIG. 4, a subgraph 430 may be selected from the graph 400. Nodes 410a included within the subgraph 430 may be used as candidate items for generating a bundle, whereas nodes 410b outside of the subgraph 430 might not be included in the bundle. The sub graph 430 includes a single primary item (the "Phone A, Carrier 1" node). The subgraph 430 can be selected in certain embodiments by choosing items that have a certain threshold value of complementary association with a substitutable item. Items below the threshold can be considered to not have sufficient quality to be recommended as complementary items.

In another embodiment, the complementary associations can be stored as item-to-item mappings in a table or other data structure. A subset of complementary items that have a certain threshold value of complementary association with a substitutable item (or items) can be selected from the table or other data structure.

Referring again to FIG. 3A, at block 306, the selected complementary items are combined with corresponding substitutable items to form bundles. For instance, one or more complementary items and a substitutable item can form a bundle. If the substitutable item is a wireless device, the bundle might include that device along with a complementary service plan, options, and/or accessories.

Once a bundle is created for some or all of the substitutable items, the bundles can be stored in physical computer storage at block 308. In one implementation, the bundles can be stored as item-to-item mappings in an associations dataset 130 (e.g., in a data repository). At decision block 310, it is determined whether additional items in the item data repository 104 remain to be analyzed. If so, the process 300A loops back to block 302. Otherwise, the process 300A ends.

In certain embodiments, the behavioral data analysis just described can be based on actual user purchases (or other selections) of wireless devices and plans. This behavioral data can therefore allow a wireless device bundle to be generated that can actually be purchased according to rules or constraints of a wireless carrier. Advantageously, in certain embodiments, the process 300A does not need to consult the wireless carrier rules to determine whether a plan is compatible with a device because the behavioral data can inherently reflect these rules. The more behavioral data that exists, in certain embodiments the more compatible or valid the items in a bundle can be.

In some instances, however, the behavioral data may be insufficient to produce bundles of compatible items. For example, little or no behavioral data might exist for items that have been recently added to a catalog. For these items, various techniques described below can be used to generate valid bundles of compatible items. In addition, in some cases, it can be useful to test or filter bundles for compatibility or validity even when behavioral data exists for the items in the bundles. Some techniques for testing or filtering bundles for item compatibility are described in the following paragraphs; additional compatibility features are described below with respect to FIGS. 5A through 5C.

In order to select items for bundles that are compatible, in some embodiments the bundle recommender 140 can ensure that a predefined number of items for each type of item are included in a bundle. For example, the bundle recommender 140 can select at most one (or N) of a type of item, at least one (or M) of another type of item, combinations of the same, and the like. In the context of a wireless handheld device, item types can include a type of plan, types of service options, accessory types (e.g., a case type, a headset type, and the like). One plan can be selected, one or more types of service options can be selected, a single case can be selected, a single headset can be selected, and so on. For wireless family plans, in some cases one device per line can be selected, at most one plan can be selected, and multiple options can be selected.

The type of an item can be determined by a category in the electronic catalog that is associated with the item. Wireless plans might fall under a "wireless plan" category, headsets might fall under a "wireless headset" category, and so on. Thus, in certain embodiments, the bundle recommender 140 can select predefined item types by selecting a limited number of items from different categories in an electronic catalog.

In another embodiment, compatibility of items in a bundle can be improved by selecting complementary items that are complementary with each other in addition to being complementary with a substitutable item. Items that are complementary with each other are less likely to be substitutable. For example, a substitutable item might be a wireless handheld device, and its complementary items might include a first service plan (e.g., for talking minutes), a second service plan, and a data plan. Each of the service plans may be complementary to the data plan, but each of the service plans might not be complementary with each other. Thus, one service plan might be selected instead of both because they are not complementary (or have low complementary association scores). Conversely, in some embodiments, the types of items in a bundle can be limited by selecting complementary items that are not substitutable with each other.

The types of items and the number of items that are provided in a bundle can be varied considerably in different implementations. In one embodiment, a bundle could include two items (e.g., a wireless device and a plan). In another embodiment, a bundle could include three items (e.g., the device, a plan, and an accessory). In another embodiment, a bundle could include four items (e.g., the device, a plan, a service option, and an accessory). A bundle could also include a number of items greater than four.

Figure 3B:
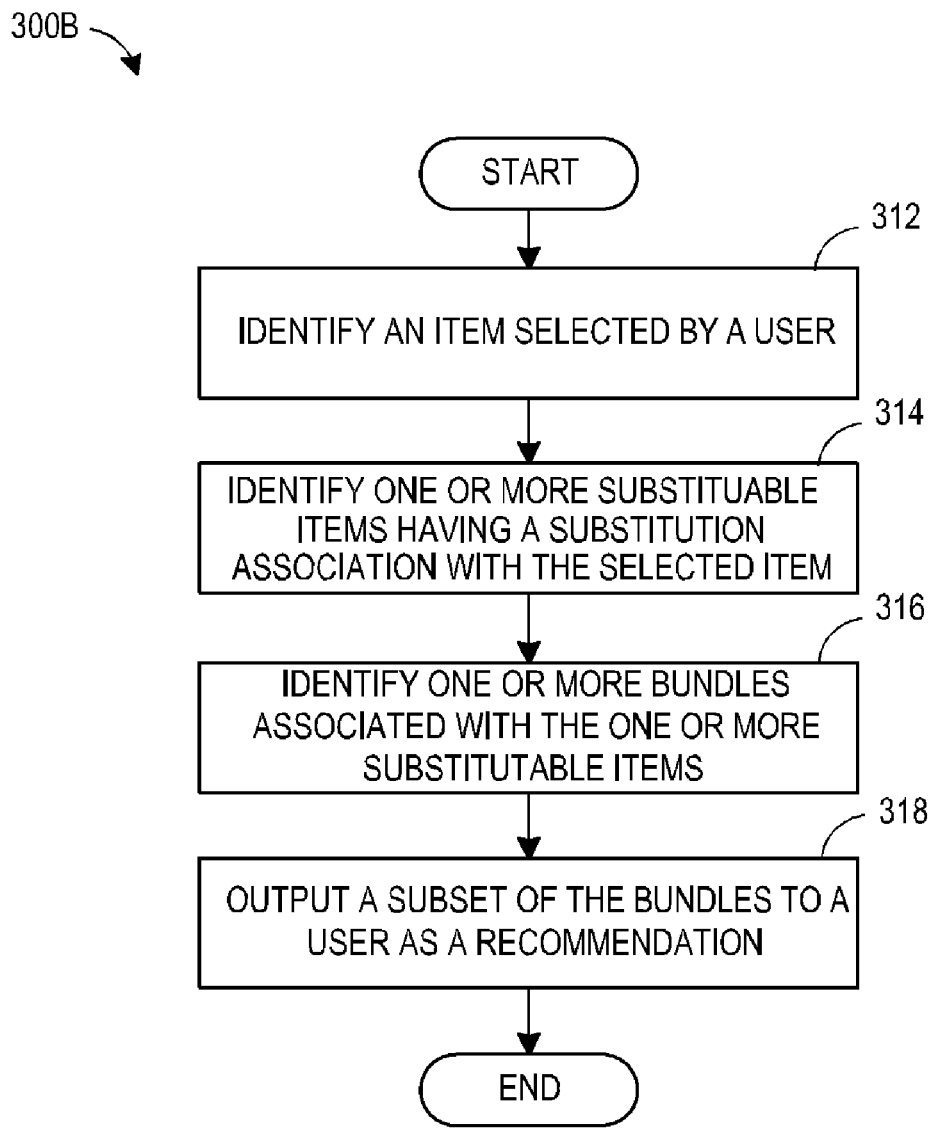
FIGS. 3B and 3C illustrate embodiments of processes for recommending bundles of items.

FIG. 3B illustrates an embodiment of a bundle recommendations process 300B that can recommend the bundles generated by the bundle generation process 300A to users. The bundle recommendations process 300B can also be implemented by the recommendations system 100. In particular, the bundle generation process 300B may be implemented by the bundle recommender 140.

At block 312, an item selected by a user is identified. At block 314, one more substitutable items are identified that have a substitution association with the item selected by the user. The substitutable items may be obtained from the associations data sets 130.

One or more bundles that are associated with one or more substitutable items are identified at block 360. These bundles may be identified by accessing the bundle associations in the associations data sets 130. For instance, the bundle recommender 140 could look up the substitutable item in the associations data sets 130 and identify one or more bundles associated with the substitutable item.

At block 318, a subset of the bundles is output to the user as a recommendation. The subset may include some or all of the bundles are associated with the one or more substitutable items. Outputting the bundle recommendations can include outputting the bundles on a page that the user is currently viewing. This page may be an item detail page that that exists primarily to describe the item selected by the user.

Alternatively, the bundle recommendations may be included together with a list of other recommendations, which may be output to the user in response to the user specifically requesting recommendations. In another embodiment, the bundle recommendations can be displayed on a search results page, such as in-line with the search results on the page. An example user interface for displaying bundle recommendations is described below with respect to FIG. 6.

Figure 3C:
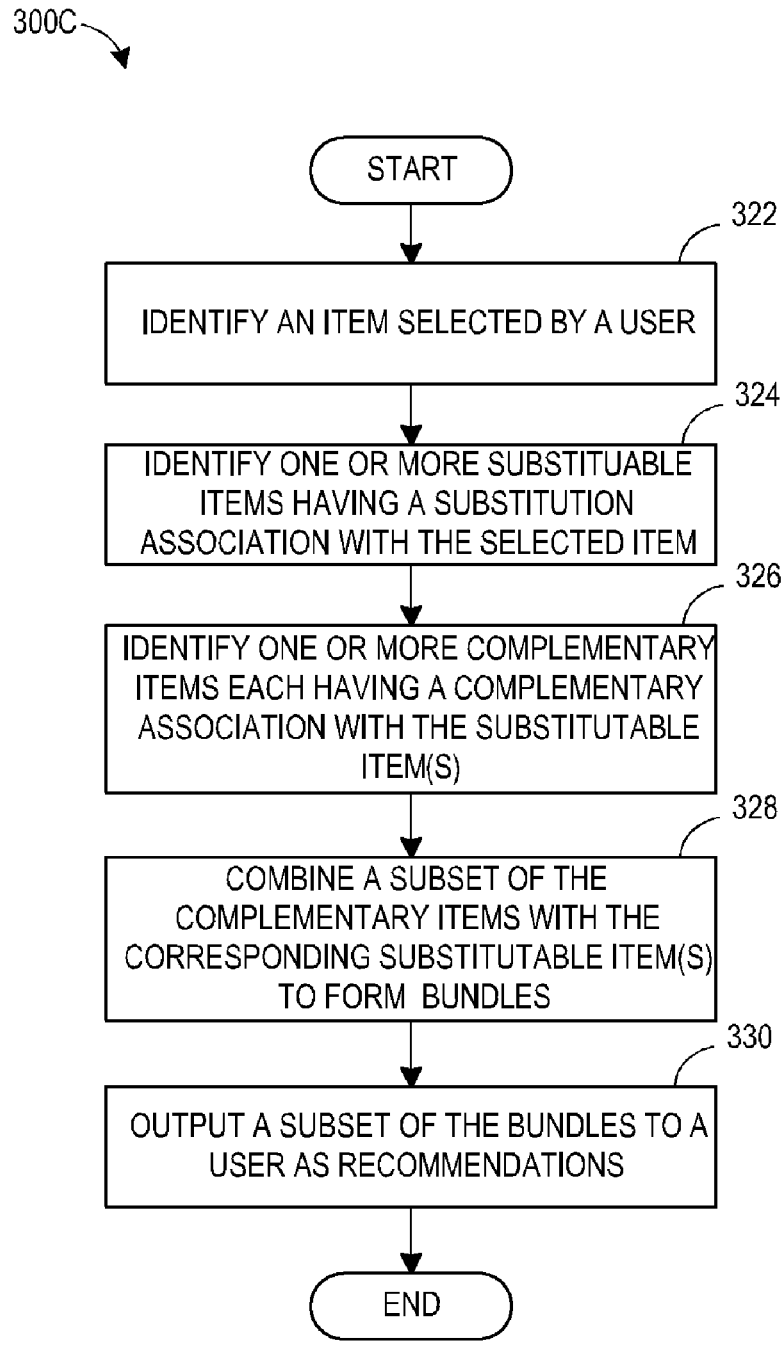

Turning to FIG. 3C, another embodiment of a bundle recommendations process 300C is shown. The bundle recommendations process 300C dynamically generates bundles in response to recommendations requests, instead of accessing pre-generated bundles. The bundle recommendations process 300C can be implemented by the bundle recommendations system 100. In particular, the bundle recommendations process 300C may be implemented by the bundle recommender 140.

At block 322, an item selected by a user is identified. At block 324, one or more substitutable items having a substitution association with the selected item are identified. One or more complementary items are identified at block 326. Each of the complementary items has a complementary association with one of the substitutable items. At block 328, a subset of the complementary items are combined with corresponding substitutable items to form bundles. A subset of the bundles can be output to the user as recommendations at block 330.

Blocks 322 through 330 can be implemented using the techniques described above with respect to FIGS. 3B and 3C, with the difference that these blocks are performed dynamically in response to a user item selection. In addition to the block shown, in some embodiments, the dynamically created bundles can also be stored in the associations data sets 130 for later recommendation to other users.

Figure 5A:
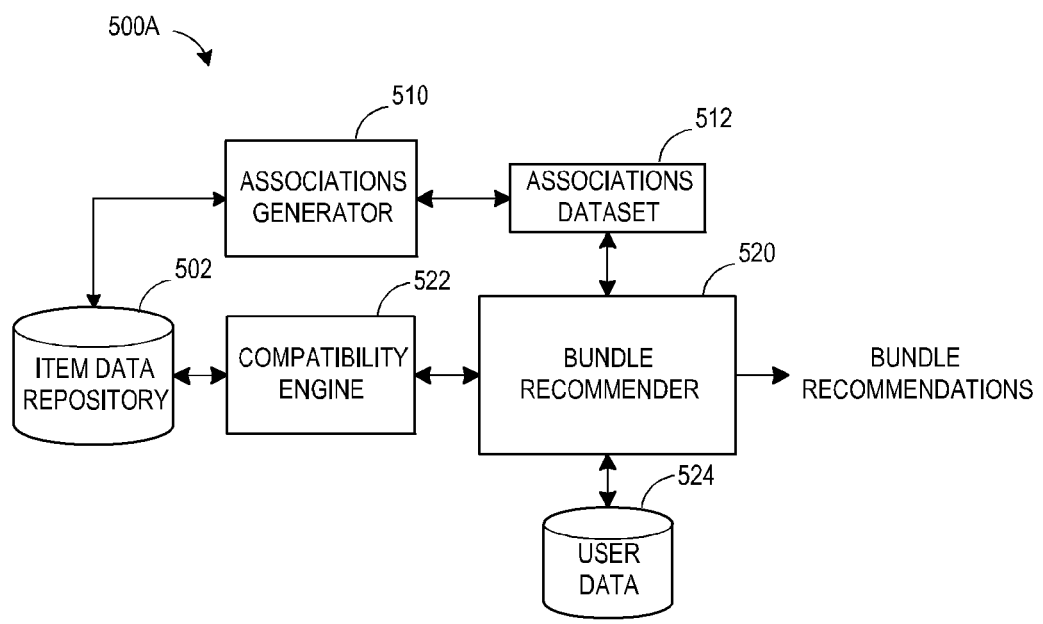
FIG. 5A illustrates another embodiment of a bundle recommendations system.

FIG. 5A illustrates another embodiment of a bundle recommendations system 500A. As described above with respect to FIG. 3A, sometimes little or no behavioral data exists for detecting valid bundles of compatible items. In certain embodiments, the bundle recommendations system 500A can detect valid bundles even in the absence of sufficient behavioral data. The bundle recommendations system 500A can be used to recommend bundles in addition to or instead of the bundle recommendations system 100.

The problem of recommending items with little or no behavioral data is often referred to as a "cold-start" problem. A naïve implementation of a cold-start bundle recommender might identify items selected by a user (e.g., a device or a plan) and then choose items having similar content to recommend to the user. This approach might not work well for certain wireless devices, plans, or other items, however, because wireless carriers often do not allow different devices, plans, and options to be mixed and matched. Rather, a wireless carrier might provide certain plans for some devices but not others. Moreover, service plans for some carriers are more monolithic than other carriers, with a plan including a package of a service and options. Other carriers might provide a more à la carte selection of services and options. It could therefore be difficult to compare similarities between the content of one carrier's monolithic plan and another carrier's plan and options.

The bundle recommendations system 500A in certain embodiments uses content-based item associations or similarities to recommend bundles in conjunction with compatibility analysis techniques to recommend valid bundles. The system 500A can therefore recommend a wireless device, plan, and options (and possibly accessories) that a carrier would allow to be purchased or used together. As another example, the system 500A can recommend a computer bundle having hardware and/or software computer components that are compatible with each other.

The system 500A generates these valid or compatible bundles in certain embodiments by modeling the workflow or stages that a user of an electronic catalog would follow in building a bundle. A user of an online wireless store might, for instance, first enter his or her ZIP code to find wireless devices available in that ZIP code. The wireless store might then present those devices, and the user could select one. In response to the user's selection, the wireless store could present the user with a variety of plans that are compatible with the selected device. The user might thus proceed to select further components of a wireless bundle in stages until the user is ready to purchase the selected items.

Advantageously, in certain embodiments, by following the same or a similar workflow that a user follows to assemble a bundle, the system 500A can generate valid bundles by construction. Generating bundles in this manner can advantageously use fewer computing resources than generating all possible permutations of bundles and thereafter determining whether the bundles are valid. However, in alternative embodiments, the system 500A can instead generate several permutations of bundles and thereafter determine whether the bundles are valid.

With continued reference to FIG. 5A, an associations generator 510 of the system 500A can include hardware and/or software for detecting and quantifying substitution associations between items in the item data repository 502. In the wireless context, the system 500A could detect substitutable devices, plans, options, and accessories, and the like. These associations can be used by a bundle recommender 520 together with item compatibility information provided by a compatibility engine 522 to generate bundles.

The associations generator 510 can detect the substitution associations using any of a variety of techniques. For instance, the associations generator 510 can compare the content of item descriptions stored in the item data repository 502 to compare the substitutability or similarity of items. In one embodiment, the associations generator 510 compares attributes or characteristics of the items and creates mappings between items based at least in part on the comparison of the attributes. The associations generator 510 can store the item-to-item mappings in an association dataset 512 in a data repository (not shown).

The associations generator 510 can assign scores to the mappings based at least partly on the similarity of the attributes of the items. Example attributes for wireless device bundles could include whether an item is a family plan, the presence of a texting option, the number of texting minutes available, other service options, whether a device is a smart phone, whether a plan has e-mail, device color, and the like.

In one embodiment, the associations generator 510 assigns binary values to the attributes for each item. For example, a binary value of 1 could be assigned if an item possesses an attribute and a binary value of 0 could be assigned if the item does not possess the attribute. The associations generator 510 could assemble a vector of binary attribute values for each item and compare vectors for different items. In one implementation, the associations generator 510 compares attribute vectors of two items by performing an XNOR logic operation on the vectors. An XNOR operation can account for attributes that both items possess and attributes that both items do not possess. The output of the XNOR operation can be summed to produce a preliminary association score for the two items. This preliminary score could be manipulated further to obtain a final association score.

In some implementations, attributes can be weighted differently. For instance, the attribute of "smart phone" could be weighted more highly than the attribute "color of the device." Weightings can be selected to refine the XNOR comparisons of the binary values in the attribute vectors.

The compatibility engine 522 includes hardware and/or software for determining compatibility relationships between items in the item data repository 502. In one embodiment, the compatibility engine 522 includes a plurality of rules or constraints stored in computer storage that allow the compatibility engine 522 to determine which items are compatible with each other. In the wireless context, these rules might be rules provided by wireless carriers for associating devices with plans and plan options. In the computer context, these rules might be provided by a computer manufacturer for associating computer components with other components (e.g., a particular type of processor with a particular type of operating system).

The compatibility engine 522 could store mappings of compatible items in the data repository 502. The compatibility engine 522 could create these mappings based on compatibility rules. Alternatively, these mappings could be provided to the compatibility engine 522 by a device manufacturer, a wireless carrier, or other entity. In such implementations, the compatibility engine 522 might not include a listing of rules.

The compatibility engine 522 can be accessed by a catalog service (see FIG. 7) of an online store or web site to build an order for a wireless device and service. When a user selects a wireless device and plan, the catalog service can follow a workflow of providing items to a user, receiving a user selection, and obtaining items compatible with the user selection from the compatibility engine 522. When a user is shopping for a wireless device, for instance, the catalog service might prompt the user to enter a ZIP code to find devices and/or plans that are available in the user's ZIP code. The catalog service might make a call to the compatibility engine 522 to determine which devices are compatible with the ZIP code provided by the user. Upon user selection of a device, the catalog service might make another call to the compatibility engine 522 to determine which service plans are compatible with the device selected by the user. Upon user selection of a plan, the catalog service might make yet another call to the compatibility engine 522 to find options that are compatible with the plan selected by the user.

Figure 5B:
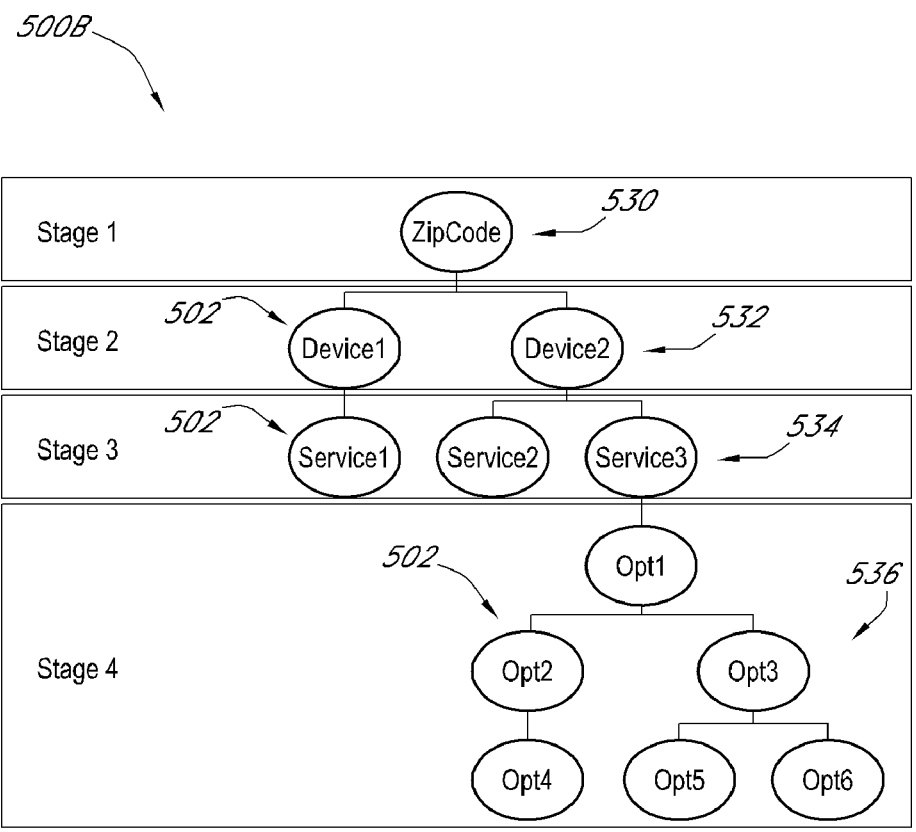
FIG. 5B illustrates an example of a bundle search space generated in certain embodiments by the bundle recommendations system of FIG. 5A.

Advantageously, in certain embodiments, a bundle recommender 520 can follow the same or similar workflow as the catalog service when generating bundles. The bundle recommender 520 can therefore generate bundles in stages. Embodiments of bundle generation stages for the context of wireless devices are shown in FIG. 5B. However, these embodiments are mere examples. For instance, the bundle recommender 520 could start the workflow of a bundle by selecting a plan and/or options, followed by a compatible device, and so forth.

Referring to FIG. 5B, the first stage 530 includes determining a ZIP code of the user. The bundle recommender 520 can determine the ZIP code of the user by requesting the user to provide this information, by analyzing the user's profile, by accessing data in an HTTP cookie, or in some other manner. At a second stage 532, the bundle recommender 520 can request devices from the compatibility engine 522 that are compatible with the provided ZIP code. In response, the compatibility engine 522 can find these items and provide representations of these items to the bundle recommender 520.

Continuing to a third stage 534, the bundle recommender 520 can request compatible services for each device obtained in the second stage 532. In response, the compatibility engine 522 can provide the compatible services for each device. In a fourth stage 536, the bundle recommender 520 can request compatible options for each service. The options may further branch out into different stages for options that depend on other options (e.g., an email plan might depend on a data plan being selected).

The bundle recommender 520 can build a tree data structure, a graph data structure, or the like to represent the items obtained from the compatibility engine 522. A graphic illustration of such a tree 500B is shown in FIG. 5B. Each stage 530, 532, 534, 536 shown includes one or more nodes 502 in the tree 500B. Each node 502 in the tree 500B can represent an item.

The bundle recommender 520 can prune the tree 500B as it is generated using the associations data in the association dataset 512 and user data 524 (see FIG. 5A). The bundle recommender 520 can prune the tree 500B by removing item nodes 502 that are less similar or substitutable than other items nodes 502 to an item that the user has selected. The bundle recommender 520 could prune the tree in one embodiment after a user has selected a device, plan, and options. For example, at the second stage 532, the bundle recommender 520 could determine that the device1 node 502 is less substitutable with an item selected by the user than the device 2 node 502. The bundle recommender 520 could then remove the device1 node 502 from the tree 500B.

At the second stage 534, the bundle recommender 520 could remove service plans that are less similar to a service plan that the user selected. The bundle recommender 520 could similarly prune nodes 502 at successive stages. The nodes can be pruned based at least partly on the strength of the associations. The resulting tree 500B could include a plurality of nodes 502 that include items having varying degrees of substitution associations or similarity with items the user has selected. From the resulting tree 500B, the bundle recommender 520 could select bundles to recommend that include any subset of the items in the tree 500B. The subset can be selected based at least partly on the strength of the associations.

The bundle recommender 520 could prune nodes 502 as each stage is generated. Alternatively, the bundle recommender 520 could generate the entire tree 500B and then prune the nodes 502. In still other embodiments, the tree can also be pruned by limiting a number of nodes per stage. In yet another embodiment, the bundle recommender 520 does not prune the tree 500B. Instead, with the entire tree 500B generated, the bundle recommender 520 can select nodes 502 that are similar to items selected by a user for inclusion in a bundle. Advantageously, in certain embodiments, the node 502 generation and/or pruning processes can be multi-threaded, so that these functions can be performed in parallel or substantially in parallel.

As described above, some carriers offer service plans that are monolithic, including one or more options together with a plan. In certain embodiments, when a user has selected such a service plan, plans and options in the tree can be compared with individual components in the user-selected service plan to determine associations. A group of a similar plan and options can be selected from the tree and included in a bundle to correspond to the more monolithic plan selected by the user.

Also as described above, the techniques described with respect to the bundle recommendations system 100 can generate bundles that are then tested or filtered for validity. A bundle generated using the behavioral techniques of the bundle recommendations system 100 could therefore be tested using certain of the techniques of the bundle recommendations system 500A. For example, the bundle recommender 140 could communicate with the compatibility engine 522 to verify that items in a bundle are compatible. In another embodiment, the bundle recommender 520 of FIG. 5A creates a tree of compatible items and uses substitution associations generated behaviorally to prune the tree.

In yet another embodiment, the bundle recommendations system 500A of FIG. 5A generates bundles of items that have little or no behavioral data, but when behavioral data is generated, the bundle recommendations system 100 of FIG. 1 takes over bundle creation. In another embodiment, both the bundle recommendations systems 100, 500 generate bundle recommendations that are output for display alongside each other. The bundles could be sorted so that behaviorally-generated bundles are output for display to a user before attribute-based bundles of FIG. 5 are output.

Moreover, either of the bundle recommendations systems 100, 500A can also be used to optimize an existing bundle by pivoting on the primary members of the bundle (e.g., a carrier and/or a device) to generate or lookup the set of similar bundles that include those primary members. The bundle recommendations system 100 or 500A could output a list of bundle substitutes ranked by association score. Alternatively, the bundle recommendations system 100 or 500A could supply the bundles to a domain-specific filter that can rank the bundles by another global score such as price. The system 100 or 500A could provide a user interface that allows a user to choose from these or other criteria for manipulating or sorting bundles.

Figure 5C:
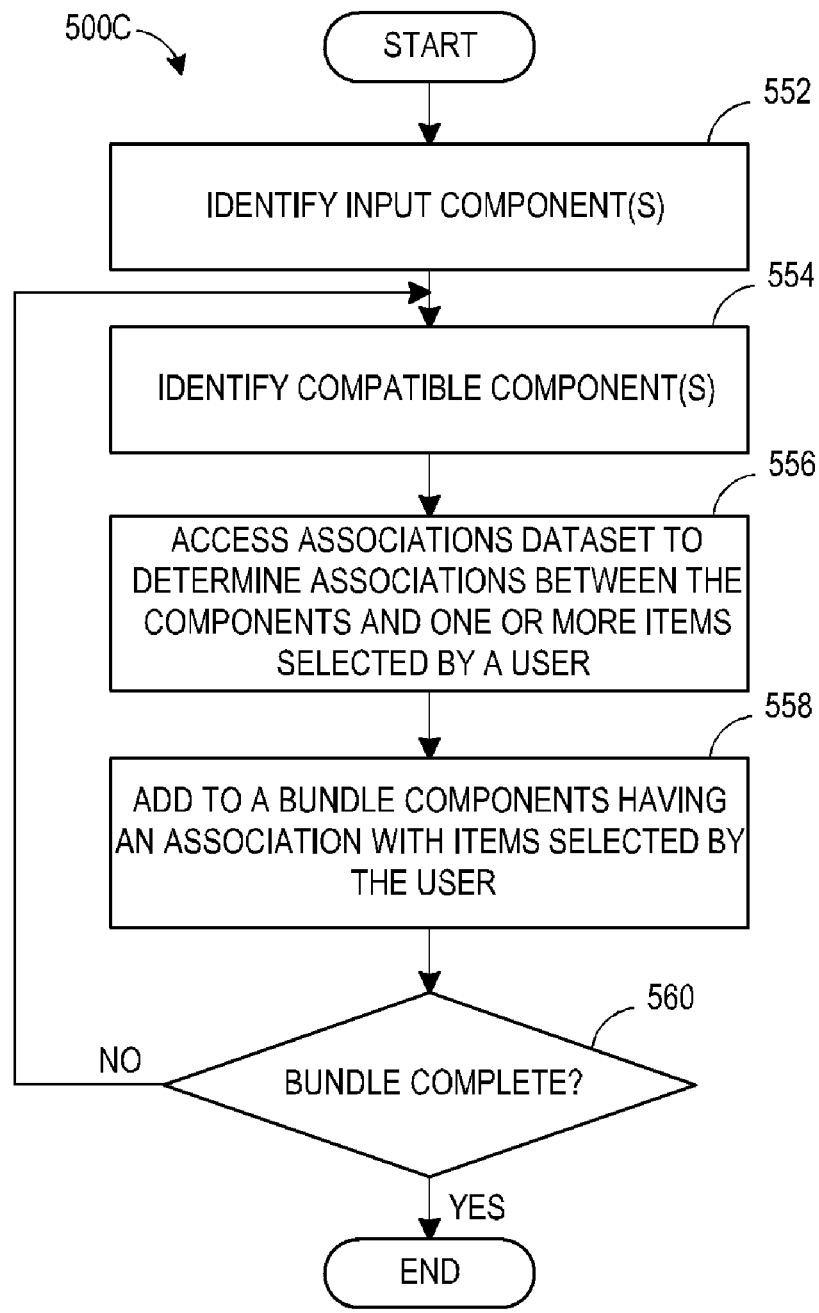
FIG. 5C illustrates another embodiment of a process for recommending bundles of items.

FIG. 5C illustrates another embodiment of a process 500C for recommending bundles of items. The process 500C could be implemented by the bundle recommendations system 500A. In particular, the process 500C could be implemented by the bundle recommender 520.

At block 552, one or more input components are identified. These could be wireless devices, for instance. These items can be seed items to find compatible items, from which bundles can be grown or generated. At block 554, compatible components are identified. These components can be compatible with the input components and can be obtained from the compatibility engine 522.

An associations dataset is accessed at block 556 to determine associations between the components and one or more items selected by the user. These associations can be attribute-based associations or behavioral associations. At block 558, components that have an association with items selected by the user can be added to a bundle. Alternatively, components that do not have an association or that have a weak association can be pruned from the bundle search space.

At block 560, it is determined whether the bundle is complete. Determining whether the bundle is complete can include testing whether certain types of items have been included in the bundle (e.g., at least one device, at least one plan, and the like). If not, the process 500C loops back to block 554, allowing additional components to be added to a bundle. Thus, the process 500C can operate in one or more stages. If the bundle is complete, the process 500C ends.

Figure 6:
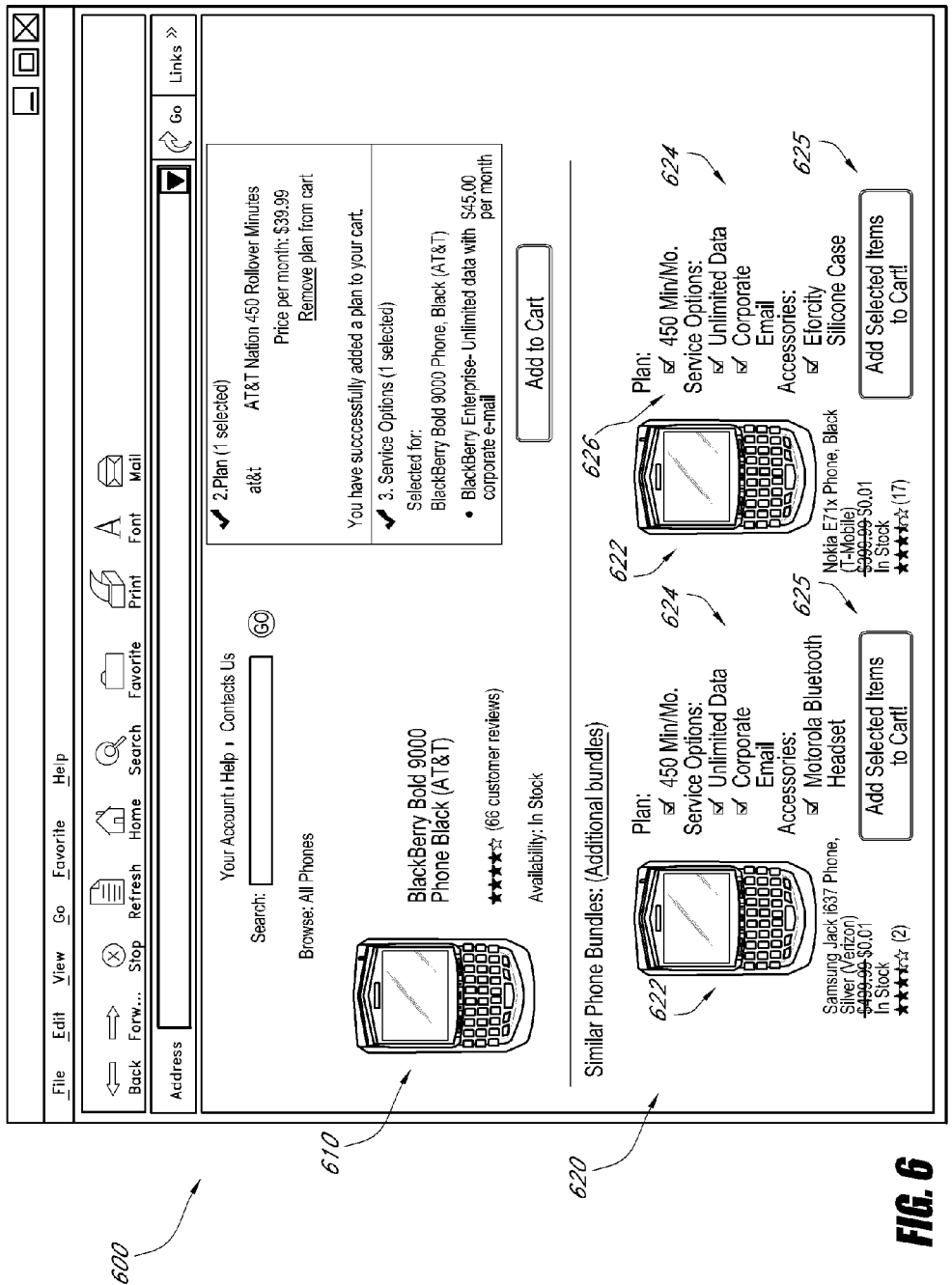
FIG. 6 illustrates an example user interface for recommending bundles of items to a user.

FIG. 6 illustrates an example user interface 600 for recommending bundles of items to a user. The user interface 600 can be generated using the recommendation system 100 and any of the processes 200, 300A, 300B, and 300C described above. The user interface 600 shown is displayed in a web browser for illustrative purposes; however, other client programs can be used to display the user interface 600

The user interface 600 is an example of an item detail page, which includes descriptive material about an item 610. The user interface 600 could have been generated, for example, in response to a user request to view the item detail page for the item 610. In addition to the item 610, bundle recommendations 620 are shown. The bundle recommendations 620 may have been obtained by using the item 610 to access the associations dataset 130 to obtain pre-generated bundle recommendations. Alternatively, the bundle recommendations 620 may have been obtained dynamically by using the item 610 to obtain substitutable items and complementary items for the substitutable items, a subset of which could have been selected to create the bundles 620.

The example bundles 620 shown include items 622 and items 624. The items 622 are wireless handheld devices that have a degree of substitutability with the item 610. The other items 624 in each bundle include a plan, service options, and accessories. These items 624 are example complementary items to the items 622.

User interface buttons 625 are provided to enable a user to add the bundles to an electronic shopping cart. Check boxes 626 next to each item 624 allow a user to selectively check or uncheck items 624, allowing the user to customize a particular bundle 620 to include any subset of the items 624. The bundle customization and other user interface features shown are merely examples and can be varied in other implementations. For example, in one embodiment, additional user interface controls could be provided that enable the user to add additional features to a bundle.

Figure 7:
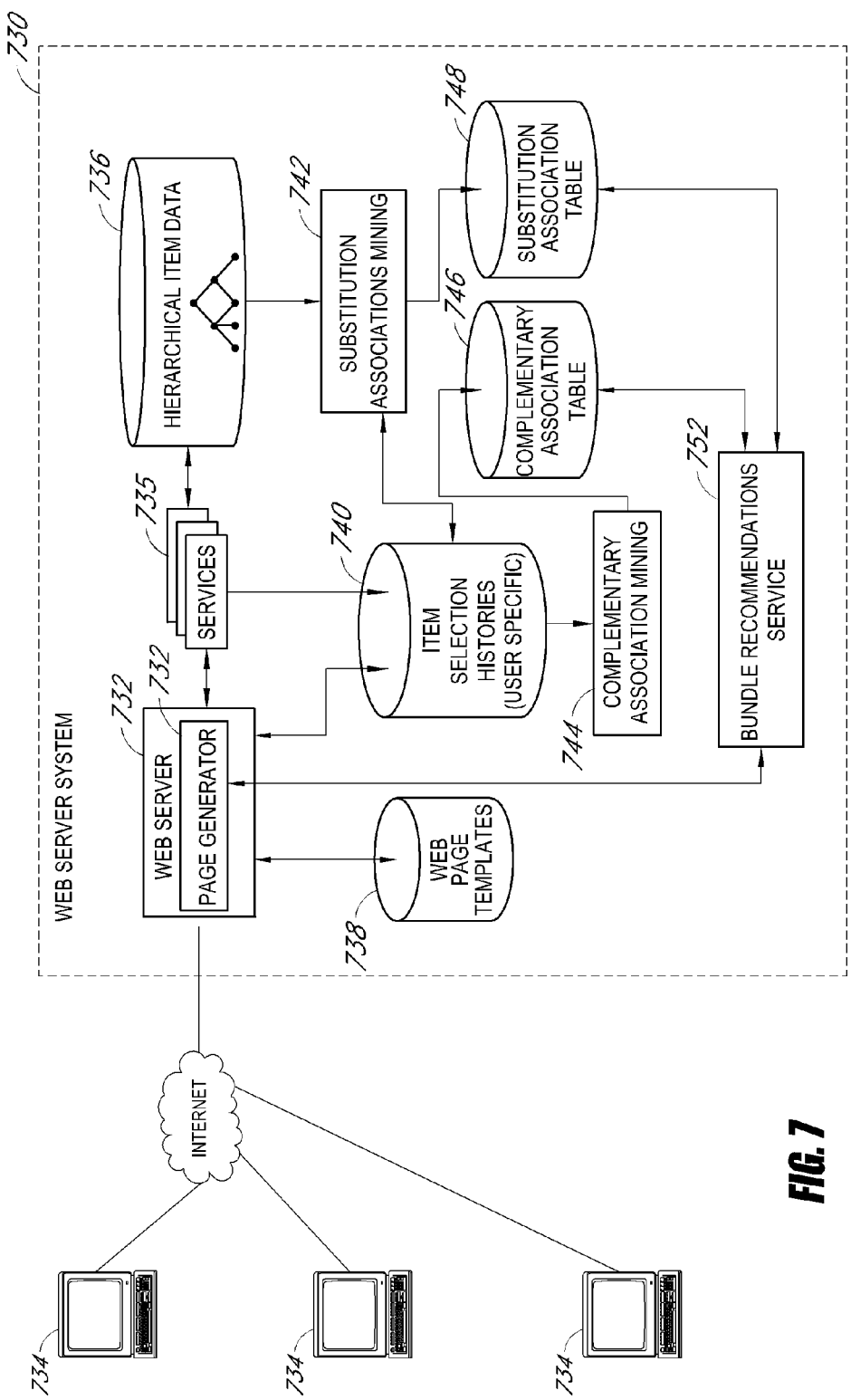
FIG. 7 illustrates one example of how various bundle recommendation features may be implemented in the context of a web-based electronic catalog system.

FIG. 7 illustrates an embodiment in which certain of the features described above are employed for purposes of detecting bundle associations between items represented in an electronic catalog. The detected bundle associations may be used for various purposes, such as to supplement item detail pages with lists of related items and/or to generate personalized recommendations for particular users. See, e.g., U.S. Pat. No. 6,912,505 and/or U.S. Provisional Application No. 61/110, 498, referred to above.

As depicted, a web server system 730 includes a web server 732 that generates and serves pages of a host web site to computing devices 734 of end users. Although depicted as desktop computers for purposes of illustration, the computing devices 734 may include a variety of other types of devices, such as wireless handheld devices (e.g., phones, PDAs, and the like), netbooks, tablets, and the like. The web server 732 may be implemented as a single physical server or a collection of physical servers, which may be geographically separate or co-located.

The web server 732 provides users with access to an electronic catalog of items represented within a database 736 or a collection of databases. The items represented in the database 736 may include items that may be purchased, rented, licensed, downloaded, or otherwise acquired via the web site (e.g., consumer electronics products; household appliances; book, music and video titles in physical and/or downloadable form; magazine subscriptions, computer programs, documents, etc.). The items may include physical products that are shipped to users and/or digital products that are delivered over a network. The catalog data stored for a given item in the database 736 typically includes a number of different attributes (e.g., name, manufacturer, author, category, subject, color, browse node, price, etc.), which may be represented as name-value pairs. Different catalog items may have different attributes. The items may be arranged within a hierarchy of browse categories to facilitate navigation of the catalog.

The web server 732, which may include any number of physical servers, runs a page generator component 733 that dynamically generates web pages in response to requests from the user computing devices 734. The web pages can be generated using a repository of web page templates 738, using data retrieved from a set of services 735. The types of services 735 can vary widely, and may include, for example, a catalog service that returns catalog data for particular items, a search service that processes search queries submitted by users, a recommendation service that generates and returns personalized item recommendations for users, a tag service that allows users to tag items, and a transaction processing services that processes purchases and/or other types of transactions.

In one embodiment, users of the web server system 730 can obtain detailed information about each item by accessing the item's detail page within the electronic catalog. Each item detail page may be located by, for example, conducting a search for the item via a search engine of the web site, or by selecting the item from a browse tree listing. Each item detail page may provide an option for the user to acquire the item from a retail entity (e.g., an operator of the system 730) and/or from another user of the system.

The web server system 730 and/or the services 735 maintain item selection histories 740 for each user of the web site. The item selection history 740 of each user identifies catalog items selected by that user via the web site, preferably together with the associated dates and times of selection. Depending upon the nature and purpose of the web site (e.g., retail sales, user-to-user sales, movie rentals, user reviews, music downloads, or combinations of the same), the item selection histories may, for example, include item purchase histories, item rental histories, item detail page viewing histories, item download histories, or any combination thereof. In some embodiments, the item selection histories 740 may include data obtained from external sources, such as the web site systems of business partners, browser toolbars of users, or user credit card records. Each user account may be treated as a separate user for purposes of maintaining item selection histories. Thus for example, if members of a household share a single account, they may be treated as a single user. User accounts may be identified by a login procedure and/or by using browser cookies that include user identifiers.

A behavior-based complementary association mining component 744 of the system 730 collectively analyzes or "mines" the item selection histories of the users periodically (e.g., once per day) to detect and quantify behavior-based associations between particular catalog items. The methods described in U.S. Pat. No. 6,912,505 and/or U.S. Provisional Application No. 61/110,498, referenced above, may be used for this purpose. The complementary association mining component 744 may generate a table 746 or other data structure that identifies pairs of items for which a behavior-based complementary association has been detected. For each such pair of items, the table 746 may also store a behavioral association strength value or "weight" indicating the strength of the association.

The associations may be based on any type or types of recorded user activity, such as purchases, rentals, viewing events, shopping cart adds, and/or downloads. The strength of the association between two item can depend on how many unique users who selected one item (for purchase, viewing, etc.) also selected the other, among other factors. These counts are proportioned against the individual item selection counts. Using the proportions, significance tests or signal processing techniques may be performed to reduce the number of invalid associations due to noise in the data. Each entry in the table 746 may, for example, be in the form of a one-to-many mapping that maps a particular item to a list of the most closely related items, together with associated weights. Behavior-based associations that fall below a selected strength threshold may be excluded from the table 746.

Although not shown, the complementary association mining component 744 could also communicate with the database 736 to determine the validity or compatibility of items in a bundle. Also not shown is the attribute-based associations generator 510 of FIG. 5; however, this component could be used in place of or in addition to the mining components 744, 742 (see below).

Also shown is a substitution association mining component 742 that periodically and collectively mines the electronic database of items 736 to detect and quantify substitution associations between particular catalog items. The substitution association mining component 742 generates a substitution associations table 748 that identifies pairs of items that share similar characteristics or content, and/or items that are related behaviorally. For each such pair, the table 748 also stores a respective substitution association strength value or weight representing the strength of the substitution association. Each such weight value can generally represent the degree to which the corresponding items are substitutable or interchangeable with each other. Alternatively, the substitution association mining component 742 can access item selection histories 640 to behaviorally-determine substitution associations.

Any of a variety of methods for comparing item attributes may be used to detect and quantify the substitution associations. Techniques from natural language processing such as simple inter-document term frequency or more complicated algorithms such as latent semantic analysis may be used. Also, pattern recognition techniques such as neural networks or Bayesian belief networks operating over the content feature space may be used. Substitution associations that fall below a selected threshold (e.g., 80% similarity if the strengths are in a probabilistic domain) may be excluded from the table 748. The substitution analysis may be limited to pairs of items in which at least one of the two items is a primary item, as described above. Alternatively, substitution associations may be generated for some or all items in the database 736.

A bundle recommendations service 752 can access the substitution and complementary associations tables 746, 748 to generate bundles for recommending to the users. In an embodiment, the bundle recommendations service 752 identifies an item selected by a user and looks up substitutable items in the substitution association table 748. The bundle recommendations service 752 can use these substitutable items to find complementary items to the substitutable items in the complementary association table 746. The bundle recommendations service 752 can select a subset of the complementary items, along with corresponding substitutable items, as bundle recommendations. The bundle recommendations service 752 can provide the bundle recommendations to the page generator 733, which can output of the bundle recommendations to the user. The bundle recommendations service 752 can use any of the bundle mining and/or recommendation features described above. The bundle recommendations service 752 can also implement any of the features of the bundle recommendations system 500A described above.

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process blocks may be stored, persistently or otherwise, in any type of computer storage.

The various features and processes described above may be used independently of one another, or may be combined in various ways. All possible combinations and subcombinations are intended to fall within the scope of this disclosure. In addition, certain method or process steps may be omitted in some implementations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of recommending a wireless device bundle to a user, the method comprising:
   creating a bundle recommendation for an end user of an electronic catalog system from a plurality of items represented in an electronic catalog of the electronic catalog system, said creating the bundle recommendation comprising:
      identifying an item of the electronic catalog that was selected by the end user, the item comprising a first wireless device or a first wireless service plan;
      accessing an associations dataset to identify a second wireless device related to the item selected by the end user;
      identifying a second wireless service plan that is compatible with the second wireless device; and
      outputting a representation of the second wireless device and the second wireless service plan together as the bundle recommendation, the bundle recommendation configured to be selectable by the end user for purchase;
      wherein said identifying the item, said accessing the associations dataset, said identifying the second wireless service plan, and said outputting are implemented by a computer system comprising computer hardware.

2. The method of claim 1, wherein identifying the second wireless service plan that is compatible with the second wireless device comprises determining whether the second wireless service plan can be purchased with the second wireless device according to a rule of a wireless carrier.

3. The method of claim 1, further comprising generating the associations dataset by at least comparing attributes of the plurality of items in the electronic catalog.

4. The method of claim 1, wherein said identifying the second wireless device available for purchase by the user further comprises determining whether the second wireless device is available in a ZIP code of the user.

5. The method of claim 1, wherein the associations dataset is generated based on an analysis of behavioral data of a plurality of end users.

6. A system for recommending a wireless device bundle to a user, the system comprising:
   a bundle mining system configured to generate an associations dataset based on an analysis of behavioral data of a plurality of end users with respect to a plurality of items in an electronic catalog; and
   a bundle recommender comprising computer hardware, the bundle recommender configured to:
      identify an item of the electronic catalog selected by the end user, the item comprising a first wireless device or a first wireless service plan;
      access the associations dataset to identify a second wireless device related to the item selected by the end user;
      identify a second wireless service plan that is compatible with the second wireless device;
      create a bundle recommendation for the end user, the bundle recommendation comprising a representation of the second wireless device and the second wireless service plan; and
      output the bundle recommendation for selection by the end user for purchase.

7. The system of claim 6, wherein the bundle recommender is further configured to identify the second wireless service plan that is compatible with the second wireless device by at least determining whether the second wireless service plan can be purchased with the second wireless device according to a rule of a wireless carrier.

8. The system of claim 6, wherein the bundle recommender is further configured to identify the second wireless service plan that is compatible with the second wireless device by at least determining whether the second wireless service plan can be purchased with the second wireless device according to a rule of a wireless carrier.

9. The system of claim 6, wherein the bundle mining system is further configured to generate the associations dataset by at least comparing attributes of the plurality of items in the electronic catalog.

10. The system of claim 6, wherein the bundle recommend is further configured to identify the second wireless device available for purchase by the user further by at least determining whether the second wireless device is available in a ZIP code of the user.

* * * * *